2 Sheets—Sheet 1.
A. WHITELEY.
GRAIN AND GRASS HARVESTER.
No. 11,710. Patented Sept. 19, 1854.
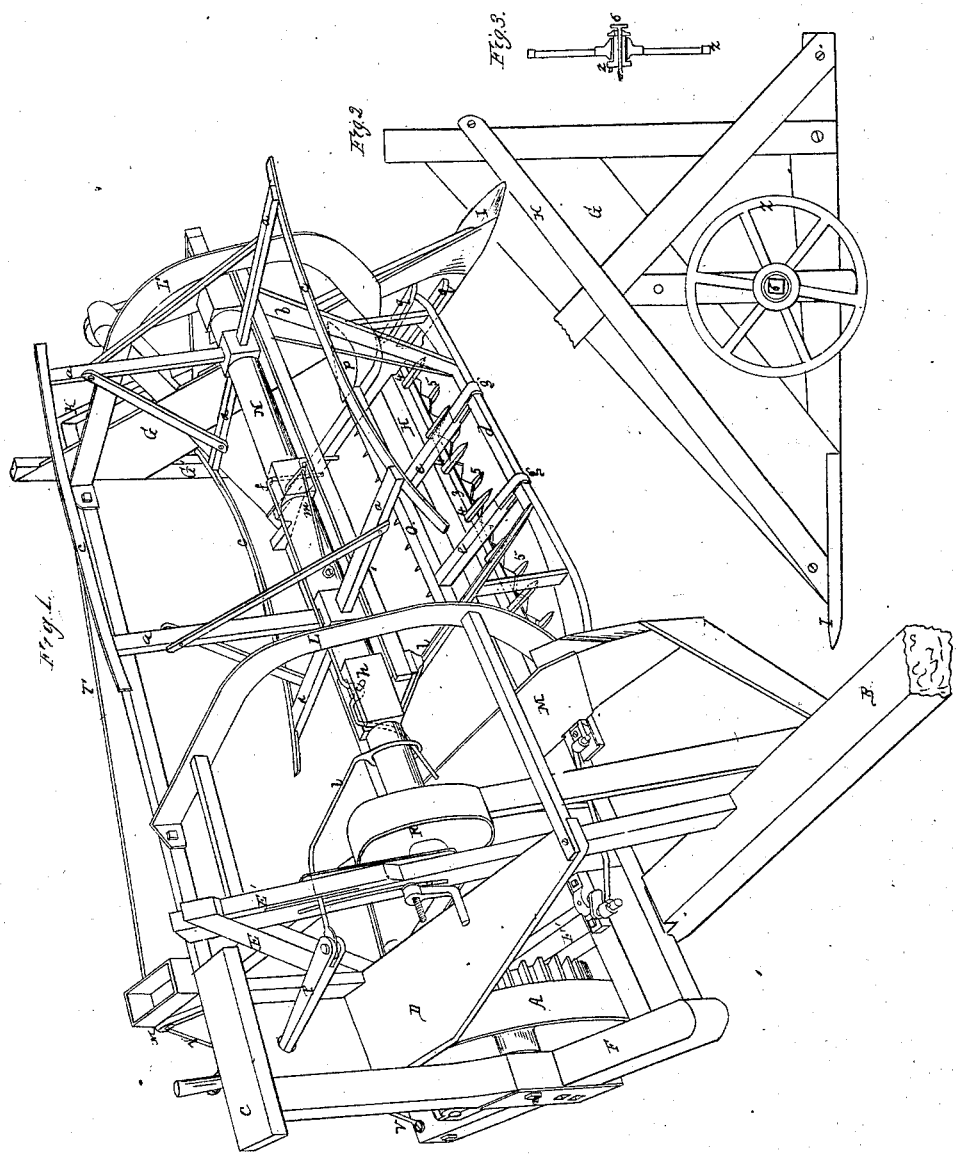

2 Sheets—Sheet 2.
A. WHITELEY.
GRAIN AND GRASS HARVESTER.
No. 11,710. Patented Sept. 19, 1854.
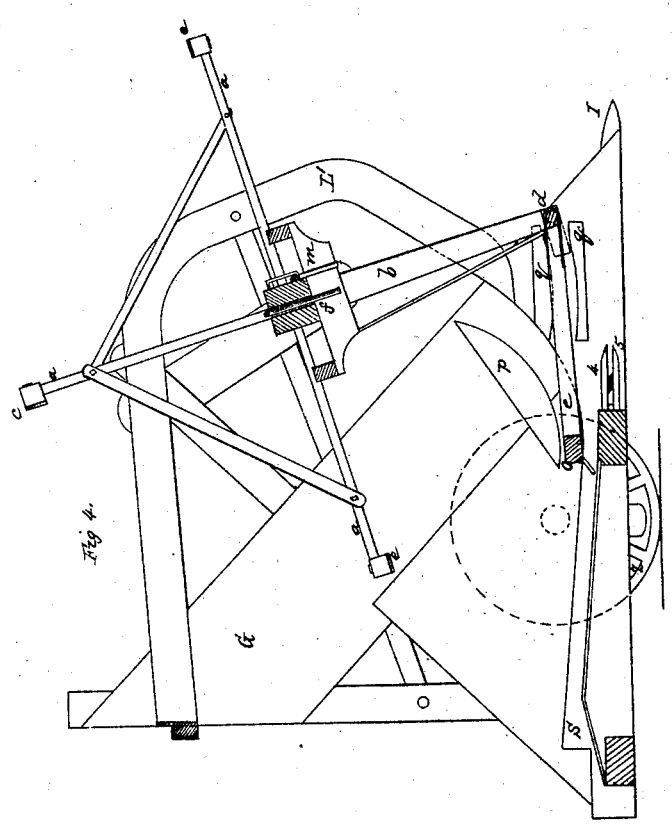

UNITED STATES PATENT OFFICE.

ABNER WHITELEY, OF SPRINGFIELD, OHIO.

IMPROVEMENT IN GRAIN AND GRASS HARVESTERS.

Specification forming part of Letters Patent No. 11,710, dated September 19, 1854.

*To all whom it may concern:*

Be it known that I, ABNER WHITELEY, of Springfield, in the county of Clarke and State of Ohio, have invented a new and useful Improvement in Reaping-Machines; and I do hereby declare that the following is a full, clear, and exact description of the same, reference being had to the accompanying drawings, making part of this specification.

This improvement admirably combines an automatic raker or deliverer of the cut grain received on the platform of the reaper, with several important improvements of the reaper itself—such as the bracing of the frame of the machine, by which the nose or grain-divider is kept from being depressed by the weight of the grain and the sag thereof transferred to the front end of the tongue and neck-yoke, and the nose is thus prevented from entering the earth; also, an improvement in the grain-wheel used for bearing the outer side of the platform by making it detachable by the withdrawal of a single bolt without risk or danger to the operator in lowering or raising the cut; also, in placing the fingers (unprovided with slots) on alternate sides of the cutter blade and bar, the edges of the cutters also alternating.

In the accompanying drawings, Figure 1 is a perspective view with the extra platform detached.

A is the master-wheel; B, the tongue or pole, (the extended end removed;) C, the driver's seat, and D his foot-rest.

E E' is an angular frame rising from the tongue and main frame F F.

G G' is an angular frame, and between these two is placed the finger-bar H and platform for receiving the grain.

I is the nose or grain-divider. Behind II will be noticed a parallel brace, K, whose object or use will be hereinafter explained.

L L' are metal rake-guides, in the inside of which the ends of the rake are guided, and it will be observed that the outward one, L', is not confined at its lower end to G, while the other one is secured to the side of the platform M. This arrangement of L' is necessary to permit the grain to pass between the brace G and guide.

N is the reel-shaft; *a a a*, the three sets of arms thereof; and *b b* the remaining pair, constructed so as to admit the rake to swing between them at their insertion in the shaft N.

*c c c* are metallic blades on the arms *a a a*. *d* unites the fourth set, and is of wood, forming a suspending-point for the rake.

*g g* are loose-fitting straps, hinging the rake O to the bars *c c*. These several arms are suitably braced.

*f* is a drop-catch passing through shaft N, being pivoted at *h*, and retained in its locked condition by the loop *l* when the knee-lever P is moved toward the left by the driver. *m* is another self-dropping latch, by means whereof the rake-head O is retained between it and *f* when locked.

R is a pulley receiving motion by a band on a pulley on the driving-pinion shaft. The reel admits of adjustment of height to suit the grain.

*p* represents one of the two upper guides for the rake-head, leaving a space between it and S, one of the lower guides forming, also, a portion of the nose and side of the platform, as it extends to the rear thereof.

*q q* are guides for the swing-piece *d* of the rake to pass between. These are of use in directing the standing grain to the cutters.

T is a metal rod, connecting the extended rear end of M with the upper end of K, and V a second rod, continuing the connection to the main frame F. It is by this arrangement that any weight received on the nose I is transferred to M, and thence transferred to the end of the tongue B.

The cutting part is designated by figures or numbers. 3 is the slide-bar, on which the cutters are secured; 4 4 4, a series of plain-faced fingers, (that is without guard or under piece or slot.) 5 5 5 are alternate fingers, placed with their faces upward, being the reverse of 4 4 4. Between these sets the cutter-blades work, and to meet the requirement of alternate fingers, the edges of the cutters also alternate, and it is by this arrangement I obviate all difficulty of choking from moist grain, spring of the blades, or otherwise.

The operation of the rake is as follows: Being hung on one of the rods or blades, it is brought into play when not locked by the bolt, and on the revolution of the reel it drops by the weight of the rake-head O, the ends of

*d* falling in the guides or ways *q q*, and enters the grooved guides near the platform, where it takes the butt of the grain previously laid by the reel and travels across the platform on the extended ends of the ways, delivering the grain by pushing it before the rake-head, either over the rear of or onto a second platform with a side delivery. The rake-head, on its leaving the grain, by a receding movement rising, the reel is ready for another stroke of the rake, as in the first. The object of the extended upper portion of the guide L is to retain the rake-head therein. The manner of locking the rake-head in light grain, so as to accumulate a bundle on the platform, is by the knee of the driver operating the lever-latch on the one side while the drop-latch secures the opposite side of the rake-head. When the lock is not used the rake freely operates on each revolution of the shaft N. The action of the cutters or knives will be understood to be reciprocating by motion from crank, &c.

In Figs. 2, 3, and 4 the grain-wheel Z is shown. It is secured, at any desired height of stubble, to the side of the platform by a single bolt passing through a short arm or axle, 7, said arm provided with a small stud to prevent its turning, while the wheel Z turns freely on the arm. By the mere turning of this bolt 7 the wheel is released from the platform, changed to a new height, and again fastened, without risk or danger consequent of other modes of attaching this wheel to the reaper.

Having described my improvements, what I claim as my invention, and desire to secure by Letters Patent, is—

1. The reel having on one of its blades a swinging or suspended rake, O, whose ends pass between and are combined with ways or guides *q q*, for the purpose of not only delivering the grain at the rear of the platform, but also better directing the standing crop to the cutters in the manner set forth.

2. The latch *f*, with appendages, for the purpose of making the rake gather more or less grain, as set forth.

3. Placing the vibrating knife-bar 3 and cutters thereon between alternately-placed fingers 4 and 5, for the purpose of dispensing with the slot-guards and sustaining the line of cut by throwing the action of the alternated shear-edge of the blade of said cutters on the upper and lower sides of the fingers.

In testimony whereof I have signed my name before two subscribing witnesses.

ABNER WHITELEY.

Witnesses:
JOHN F. CLARK,
SAML. GRUBB.